United States Patent
Melanson

(10) Patent No.: US 8,368,361 B2
(45) Date of Patent: Feb. 5, 2013

(54) SWITCHING POWER CONVERTER CONTROLLER WITH DIRECT CURRENT TRANSFORMER SENSING

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 669 days.

(21) Appl. No.: 12/571,431

(22) Filed: Sep. 30, 2009

(65) Prior Publication Data

US 2011/0075448 A1    Mar. 31, 2011

(51) Int. Cl.
*G05F 1/613* (2006.01)
*G05F 3/16* (2006.01)
*H02M 5/42* (2006.01)
*H02M 7/04* (2006.01)
*H02M 7/68* (2006.01)

(52) U.S. Cl. .................................. 323/224; 363/89
(58) Field of Classification Search .......... 323/222–224; 363/89
See application file for complete search history.

(56) References Cited

U.S. PATENT DOCUMENTS 5,867,379 A * 2/1999 Maksimovic et al. ........... 363/89
8,040,114 B2 * 10/2011 Saint-Pierre .................. 323/222

OTHER PUBLICATIONS

J. Noon, Texas Instruments Application Report SLUA146A, UC3855A/B High Performance Power Factor Preregulator, May 1996, revised Apr. 2004.
Unitrode Products, from Texas Instruments, UC2855A/B, UC3855A/B, High Performance Power Factor Preregulator, SLUS328B, Jun. 1998, revised Oct. 2005.

* cited by examiner

*Primary Examiner* — Jue Zhang
(74) *Attorney, Agent, or Firm* — Hamilton & Terrile, LLP; Kent B. Chambers

(57) ABSTRACT

A power control system includes a current transformer to step down a switch current of a switching power converter. In at least one embodiment, the stepped down current is received by a switching power converter controller. Since the current is received by the controller, the current is not converted into a voltage prior to receipt by the controller in order for the controller to monitor an inductor current of the switching power converter. In at least one embodiment, the controller compares the stepped down switch current with a reference current. In at least one embodiment, the controller includes a voltage converter to convert the switch current into a voltage within the controller. The controller compares the voltage representing the switch current with a reference voltage. The controller can use the current or voltage comparisons to control power factor correction and output voltage regulation of a switching power converter.

24 Claims, 5 Drawing Sheets

SWITCHING POWER CONVERTER CONTROLLER WITH DIRECT CURRENT TRANSFORMER SENSING

BACKGROUND OF THE INVENTION

1. Field of the Invention

The present invention relates in general to the field of electronics, and more specifically to a switching power converter control system and method with direct current transformer sensing.

2. Description of the Related Art

Switching power converters provide regulated output voltages for numerous electronic products including lamps, such as light emitting diode and gas discharge type lamps, cellular telephones, computing devices, personal digital assistants. As the name suggests, switching power converters include a switch that controls the output voltage. Sensing current in the switch provides feedback to a controller to allow the controller to control the switch and, thus, regulate the output voltage of the switching power converter. The switch current can be sensed in any number of ways. Switch current can be sensed as a voltage across a sense resistor in series with the switch. However, conducting a high switch current across the sense resistor of the switching power converter can result in consequential power losses. Current transformers provide a more efficient way of sensing the switch current. A primary-side of the current transformer is placed in series with the switch to conduct the switch current. The secondary-side conducts a stepped-down switch current. A sense resistor across the secondary-side of the current transformer develops a voltage corresponding to the stepped-down switch current, thus, lowering the power loss across the sense resistor.

FIG. 1 depicts a power control system 100, which includes switching power converter 102. In at least one embodiment, switching power converter 102 operates in a continuous conduction mode (CCM). In CCM, the inductor current $i_L$ in inductor 104 does not go to zero during operation of switching power converter 102. As subsequently described in more detail, in CCM operation, PFC and output voltage controller 106 senses switch current $i_{DP}$ in switch 108 by sensing a voltage $V_{CTS}$ corresponding to a current $i_{DS}$ across a secondary winding 110 of current transformer 112. Switch 108 is implemented as a field effect transistor (FET).

Switching power converter 102 converts voltage sourced from voltage source 114 into a regulated link voltage $V_{LINK}$ across link capacitor 116. Voltage source 114 supplies an alternating current (AC) input voltage $V_{IN}$ to a full bridge diode rectifier 117. The voltage source 114 is, for example, a public utility, and the AC voltage $V_{IN}$ is, for example, a 60 Hz/110V line voltage in the United States of America or a 50 Hz/220V line voltage in Europe. The rectifier 117 rectifies the input voltage $V_{IN}$ and supplies a rectified, time-varying, line input voltage $V_X$ to the switching power converter 102. Capacitor 115 filters high reference components of input voltage $V_X$ and, thus, provides electromagnetic interference (EMI) protection.

The switching power converter 102 includes at least two switching operations. The first operation controls switch 108 to provide power factor correction (PFC), and the second operation controls switch 108 to provide regulation of link voltage $V_{LINK}$. The goal of power factor correction technology is to make the switching power converter 102 appear resistive to the voltage source 114 so that the real power provided to switching power converter 102 is equal to the apparent power provided to switching power converter 102.

During operation of switching power converter 102, the inductor current $i_L$ ramps 'up' when switch 108 conducts, i.e. is "ON", and ramps down when switch 108 is nonconductive, i.e. is "OFF". When switch 108 is ON, inductor current $i_L$ magnetizes inductor 104 and also magnetizes the primary-side winding 118 of current transformer 112. In at least one embodiment, current transformer 112 is configured as a toroid with a primary-side to secondary-side winding ratio of 1:N. "N" is, for example, 10. The primary-side transformer current $i_{DP}$ equals the inductor current $i_L$ when switch 108 is ON. Thus, the second-side current $i_{DS}$ equals $i_{DP}/N$ when switch 108 is ON.

When switch 108 is ON, secondary-side current $i_{DS}$ flows through diode 120 and is filtered by filter 122 to reduce noise. Resistor 121 provides a number of functions, such as reverse current protection for diode 120. The resistance value of resistor 121 is a matter of design choice. In at least one embodiment, resistor 121 has a resistance greater than an input resistance of load 132. In at least one embodiment, the resistance of resistor 121 is approximately equal to at least ten times the input resistance of load 132. A secondary-side current transformer voltage $V_{CTS}$ develops across filter 122 when switch 108 is ON. In embodiment, filter 122 is designed so that the transformer voltage $V_{CTS}$ is 1V at the peak of secondary-side current $i_{DS}$. Current synthesizer 126 charges capacitor 128 with a current proportional to the switch current $i_{DS}$. The transformer voltage $V_{CTS}$ is level shifted up one 'diode drop' voltage across diode 124 relative to the voltage $V_{CTC}$ across capacitor 128. (A "diode drop" voltage refers to a voltage drop across a forward biased diode. A typical diode drop voltage is 0.7V). The inductor current $i_L$ is the same as the switch current $i_{DS}$ when switch 108 is ON. Thus, control signal generator 130 determines the inductor current $i_L$ when switch 108 is ON based on the secondary-side voltage $V_{CTS}$.

When switch 108 is OFF, secondary-side current $i_{DS}$ is zero, and inductor current $i_L$ flows through diode 127 to charge link capacitor 116. Diode 127 prevents reverse current flow into inductor 104. PFC and output voltage controller 106 includes a current synthesizer 128 to reconstruct the inductor current $i_L$ during the OFF time of switch 108. In general, current synthesizer 126 controls the discharge of capacitor 128 in proportion to the input voltage $V_X$ and the link voltage $V_{LINK}$ to reconstruct the down slope of inductor current $i_L$ and, thus, determine the inductor current $i_L$ when switch 108 is OFF. Upon determining the switch current $i_{DS}$ while switch 108 is ON using the secondary-side voltage $V_{CTS}$ of current transformer 110 and reconstructing the inductor current $i_L$ when switch 108 is OFF, control signal generator 130 generates control signal $CS_0$ to regulate the link voltage $V_{LINK}$ and provide power factor correction for switching power converter 102. The link voltage $V_{LINK}$ is supplied to load 132. A more complete explanation of an exemplary operation of PFC and output voltage controller 106 is described in "High Performance Power Factor Preregulator", Unitrode Products from Texas Instruments, part numbers UC2855A/B and UC3855A/B, Data Sheet June 1998, revised October 2005 and Application Report SLUA146 May 1996, revised April 2004.

The cost of external components is generally higher than the cost of integrated components. For example, if filter 122 could be eliminated, the cost of power control system 100 could potentially be reduced.

SUMMARY OF THE INVENTION

In one embodiment of the present invention, an apparatus includes an integrated circuit. The integrated circuit includes a controller configured to:
  receive a current from a secondary-side of a current transformer, wherein the secondary-side current represents an inductor current in a switching power converter; and
  utilize the received secondary-side current to control power factor correction of the switching power converter.

In another embodiment of present invention, a method includes receiving a current from a secondary-side of a current transformer at a node of a switching power converter controller. The secondary-side current represents an inductor current in a switching power converter. The method includes utilizing the received secondary-side current to control power factor correction of the switching power converter.

In a further embodiment of the present invention, an apparatus includes an integrated circuit. The integrated circuit includes a controller configured to:
  receive a current from a secondary-side of a current transformer, wherein the secondary-side current represents an inductor current in switching power converter;
  compare the current received from the current transformer with a reference current; and
  generate a switch control signal to control conductivity of a switch in the switching power converter to control power factor correction and regulate the link voltage;
  determine an elapsed time between a beginning of a conductive time of the switch and when the current received from the current transformer exceeds the reference current; and
  utilize the elapsed time to control conductivity of the switch.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A power control system includes a current transformer to step down a switch current of a switching power converter. In at least one embodiment, the stepped down current is received by a switching power converter controller. Since the current is received by the controller, the current is not converted into a voltage prior to receipt by the controller in order for the controller to monitor an inductor current of the switching power converter. In at least one embodiment, The controller utilizes current sensing of the stepped down switch current to control at power factor correction of a switching power converter. In at least one embodiment, the controller includes a current comparator that compares the stepped down switch current with a reference current. The reference current can be fixed or programmable. In at least one embodiment, current sensing provides very high accuracy using a relatively inexpensive comparator. In at least one embodiment, the controller includes a voltage converter to convert the switch current into a voltage within the controller. The controller includes a comparator to compare the voltage representing the switch current with a reference voltage. In at least one embodiment, the controller uses the current or voltage comparisons to control power factor correction and output voltage regulation of a switching power converter. The reference voltage can be fixed or programmable.

Figure 1:
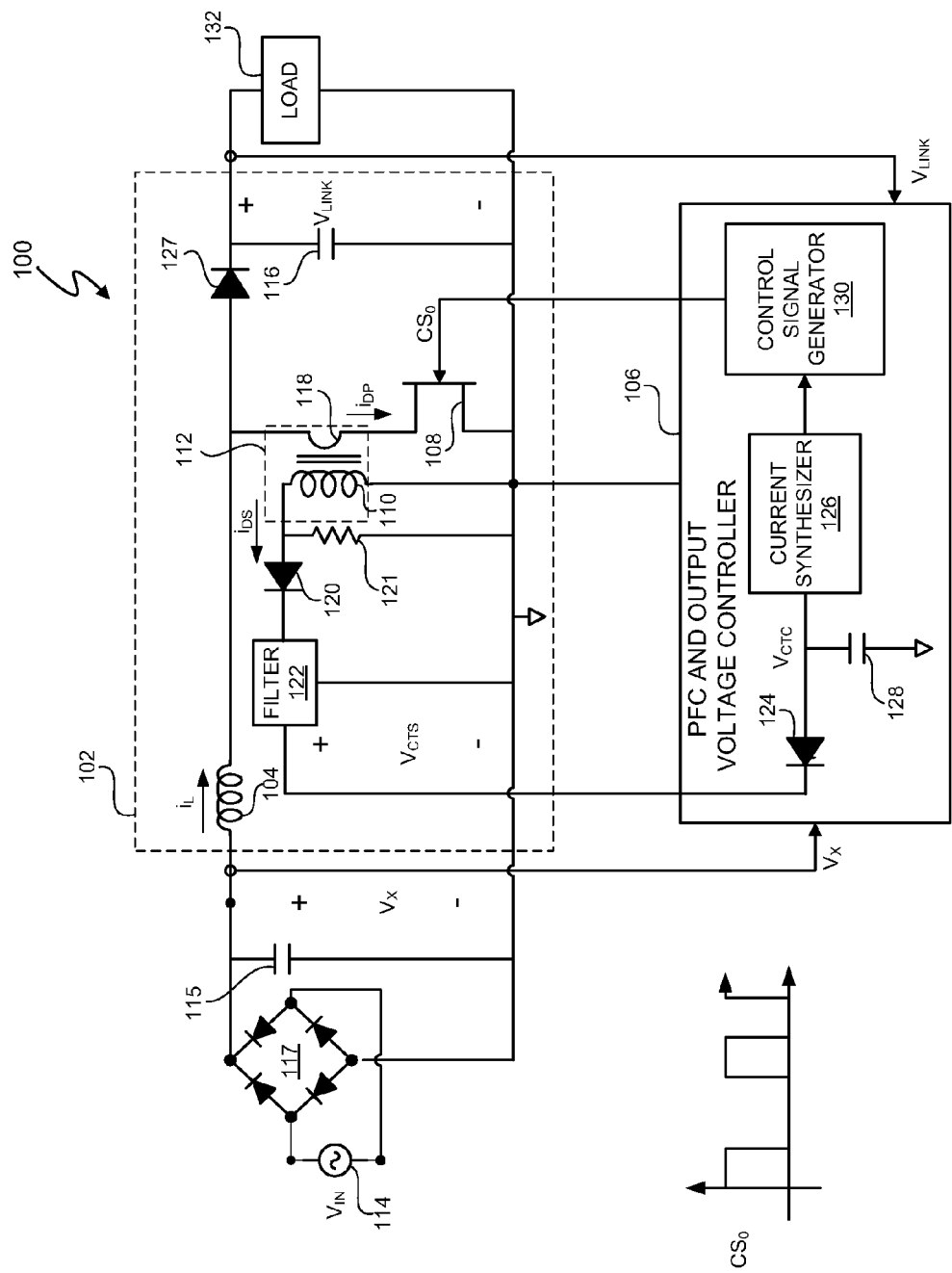
FIG. 1 (labeled prior art) depicts a power control system having a current transformer and voltage sensing to determine inductor current in a switching power converter.
Figure 2:
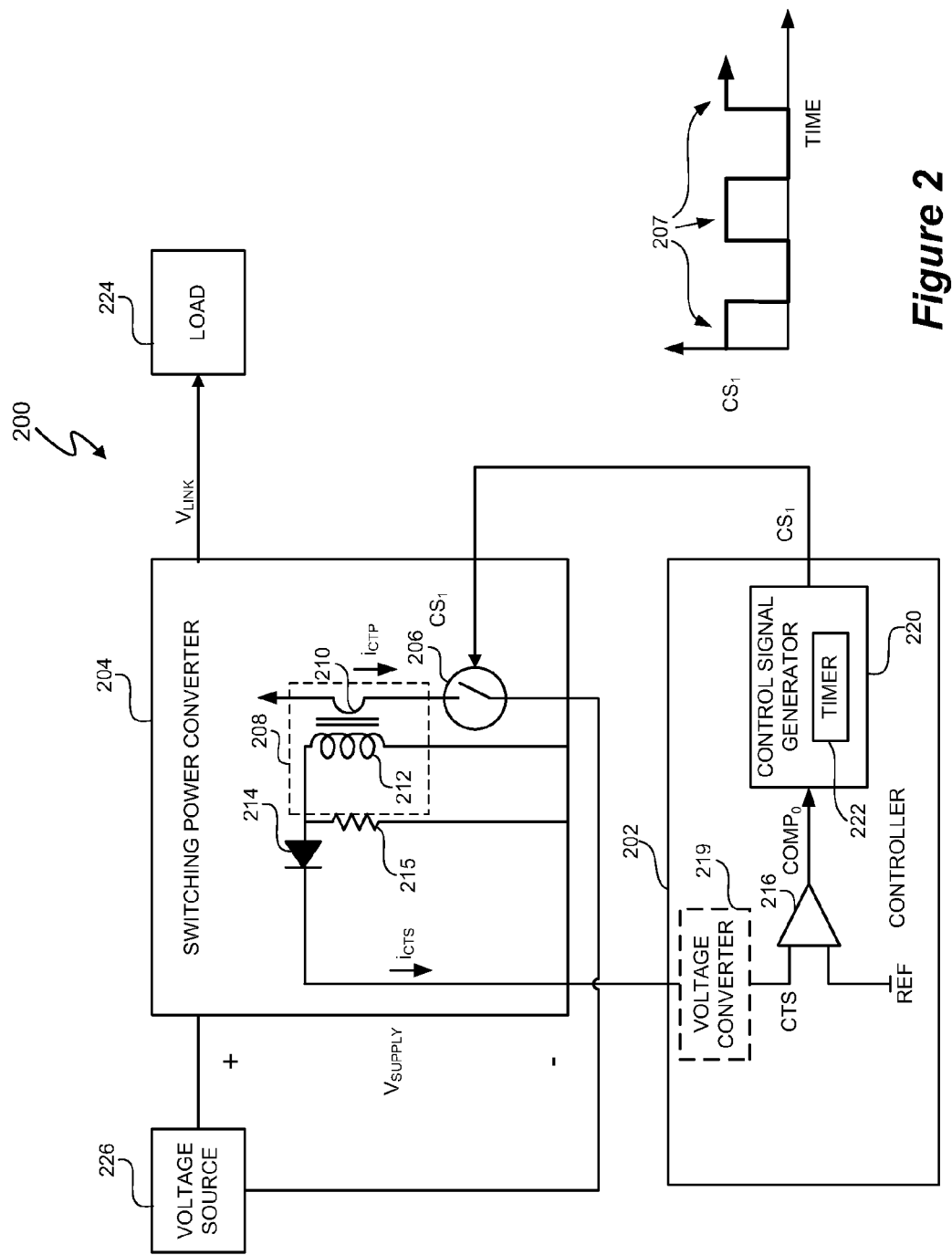
FIG. 2 depicts a power control system having a current transformer and direct current sensing to determine inductor current in a switching power converter.

FIG. 2 depicts power control system 200 having a controller 202 to control switching power converter 204. As subsequently described in more detail, controller 202 senses secondary-side current $i_{CTS}$, which is derived from switch current $i_{CTP}$ of switching power converter 204. In at least one embodiment, the secondary-side current $i_{CTS}$ is received by the controller 202 from the switching power converter 204. Thus, the secondary-side current $i_{CTS}$ is not converted into a voltage prior to receipt of the secondary-side current $i_{CTS}$. Controller 202 uses the sensed current $i_{CTS}$ to determine switch control signal $CS_1$, and switch control signal $CS_1$ controls the conductivity of switch 206. By directly sensing the switch related current $i_{CTS}$, in at least one embodiment, power control system 200 reduces costs associated with external components, such as components of filter 122 (FIG. 1).

Power control system 200 includes a current transformer 208 that steps down the primary-side switch current $i_{CTP}$. The switch current $i_{CTP}$ magnetizes the primary-side 210 of current transformer 208 and induces current $i_{CTS}$ in the secondary-side 212 of current transformer 208. Current transformer 208 can be any type of transformer and is, in at least one embodiment, a toroid configured transformer. The ratio of the primary-side, switch current $i_{CTP}$ to secondary-side current $i_{CTS}$ is 1:N, where N is the ratio of turns on the secondary-side 212 to the primary-side 210 of current transformer 208. N can be any number and is, for example, 10. Thus, for a switch current $i_{CTP}$ of 10 A, the secondary-side current $i_{CTS}$ is 1 A, i.e 10 Amps/N=10/10 Amps=1 A. Diode 214 prevents reverse current flow through the secondary-side 212. Resistor 215 provides a number of functions, such as reverse current protection for diode 214. The resistance value of resistor 215 is a matter of design choice. In at least one embodiment, resistor 215 has a resistance greater than an input resistance of load 224. In at least one embodiment, the resistance of resistor 215 is approximately equal to at least ten times the input resistance of load 224. In at least one embodiment, the switch current $i_{CTP}$ and, thus, the secondary-side current flow only when switch 206 is ON. The inductor current $i_L$ equals the switch current $i_{CTP}$ when switch 206 is ON. Thus, the inductor current $i_L$ equals the secondary-side current $i_{CTS}$ divided by N when switch 206 is ON, i.e. $i_L=i_{CTS}/N$.

As previously discussed in the context of PFC and voltage controller 106, controller 202 uses information about the inductor current $i_L$ in switching power converter 204 to control a duty cycle of control signal $CS_1$. The switch current $i_{CTP}$ on the primary-side of current transformer 208 is the inductor current $i_L$ when switch 206 is ON. The secondary-side current $i_{CTS}$ is a stepped down version of the switch current $i_{CTP}$, and, thus, secondary-side current $i_{CTS}$ represents the inductor current $i_L$ when switch 206 is ON. Since the relationship between the inductor current $i_L$ and switch current $i_{CTS}$ is known when switch 206 is ON, i.e. $i_{CTS}=i_L/N$, sensing secondary-side current $i_{CTS}$ when switch 206 is ON provides controller 202 with the information about inductor current $i_L$ to generate control signal $CS_1$.

Controller 202 directly senses secondary-side current $i_{CTS}$ at an input of current comparator 216. The process by which controller 202 senses the secondary-side current $i_{CTS}$ is a matter of design choice. In at least one embodiment, controller 202 performs a direct current comparison between secondary-side current $i_{CTS}$ and a reference current. In at least one embodiment, controller 202 converts the secondary-side current $i_{CTS}$ into a voltage and compares the voltage with a reference voltage. For example, in at least one embodiment, reference REF is a reference current, and signal CTS is the secondary-side current $i_{CTS}$. Comparator 202 compares signal CTS directly with reference REF. In at least one embodiment, reference REF is a voltage reference source, and signal CTS is a voltage representing secondary-side current $i_{CTS}$. In this embodiment, controller 202 includes optional voltage converter 219 to receive secondary-side current $i_{CTS}$ and convert secondary-side current $i_{CTS}$ into signal CTS. Comparator 216 then compares the signal CTS, which represents secondary-side current $i_{CTS}$ as a voltage, with the voltage of reference REF. The output signal $COMP_0$ represents the result of the comparison by comparator 216. In at least one embodiment, the reference 218 is set to a desired average value of signal CTS. Control signal generator 220 monitors the output signal $COMP_0$ to determine the time T1 that elapses from when the control signal generator 220 turns switch 2060N until the output signal $COMP_0$ indicates that the secondary-side current $i_{CTS}$ equals the reference current. For example, in at least one embodiment, control signal generator 220 initiates timer 222 when control signal generator 220 generates a pulse of control signal $CS_1$ to turn switch 2060N.

In at least one embodiment, when the signal CTS is less than the reference REF, the output signal $COMP_0$ of comparator 216 is a logical 0. When the signal CTS increases to a value greater than the reference REF, the output signal $COMP_0$ switches to a logical 1. When the output signal $COMP_0$ switches to logical 1, control signal generator 220 observes the elapsed time T1 determined by timer 222. Control signal generator 220 utilizes the elapsed time T1 to generate control signal $CS_1$. Thus, in at least one embodiment, determination of the control signal $CS_1$ is derived from the value of secondary-side current $i_{CTS}$, and the secondary-side current $i_{CTS}$ is derived from the inductor current $i_L$. Commonly assigned U.S. patent application Ser. No. 11/864,366 filed on Sep. 28, 2007, entitled "Time-Based Control of a System Having Integration Response", and inventor John. L. Melanson describes exemplary systems and methods for generating control signal $CS_1$ using the elapsed time T1. U.S. patent application Ser. No. 11/864,366, referred to herein as Melanson I, is hereby incorporated by reference in its entirety. The particular implementation of controller 202 is a matter of design choice. For example, controller 202 can be implemented using analog and/or digital circuits or using analog or digital circuits in combination with a processor executing software instructions stored in a memory.

In at least one embodiment, controller 202 generates control signal $CS_1$ and controls switch 206 to operate switching power converter 202 in continuous conduction mode. In at least one embodiment, controller 202 also controls the conductivity of switch 206 to regulate link voltage $V_{LINK}$ and control power factor correction of switching power converter 204. Switching power converter 204 can be any type of switching power converter such as boost-type converter (such as switching power converter 102 of FIG. 1), a buck-type converter, a buck-boost converter, or a Cúk converter. Switching power converter 204 supplies the link voltage $V_{LINK}$ to load 224. Load 224 can be any type of load. For example, in at least one embodiment, load 224 is a power supply, such as a DC-DC or DC-AC converter. "DC" stands for direct current. "AC" stands for alternating current. Load 224 can also include, for example, a lighting system that includes one or more light emitting diodes or gas discharge lamps. In at least one embodiment, switch 206 is a field effect transistor (FET), and control signal $CS_1$ is a duty cycle modulated signal, such as signal 207. Voltage source 226 can be any type of voltage source, such as AC voltage source 101. In at least one embodiment, voltage source 226 includes a rectifier (not shown) and supply voltage $V_{SUPPLY}$ is a rectified AC voltage.

Figure 3:
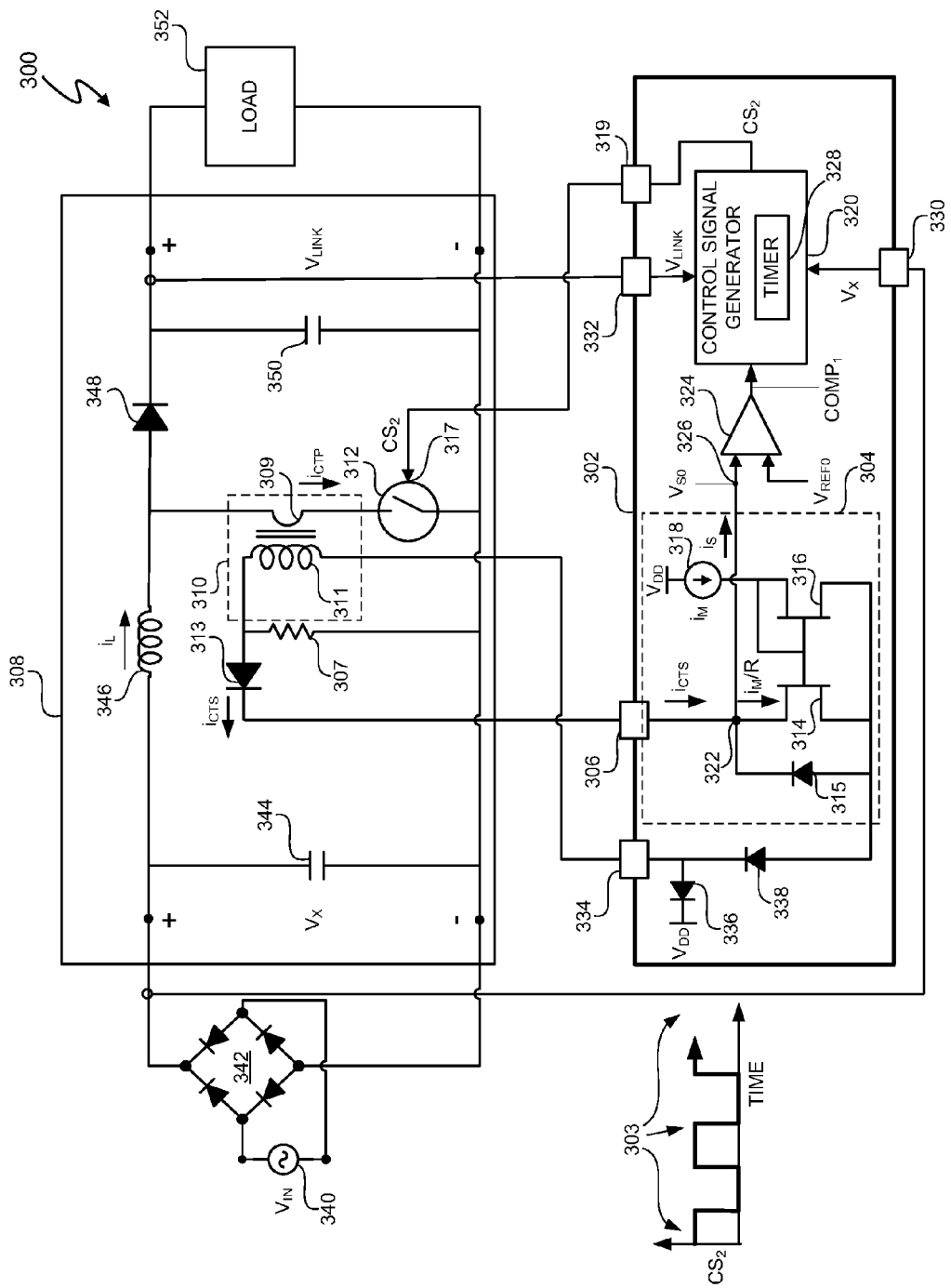
FIG. 3 depicts a power control system embodiment of the power control system of FIG. 2.

FIG. 3 depicts power control system 300, which represents one embodiment of power control system 200 (FIG. 2). Power control system 300 includes controller 302, and controller 302 includes current comparator 304, which respectively represent embodiments of controller 202 and current comparator 216 (FIG. 2). Controller 302 is an integrated circuit that generates a control signal $CS_2$ to control power factor correction and regulate link voltage $V_{LINK}$ of switching power converter 308. In at least one embodiment, control signal $CS_2$ is a duty cycle modulated signal, such as signal 303. As previously discussed in the context of PFC and voltage controller 106 and controller 202, controller 302 uses information about the inductor current $i_L$ in switching power converter 308 to control a duty cycle of control signal $CS_2$. The switch current $i_{CTP}$ in the primary-side winding 309 of current transformer 310 is the inductor current $i_L$ when switch 312 is ON.

The secondary-side current $i_{CTS}$ in the secondary-side winding 311 is a stepped down version of the switch current $i_{CTP}$ and, thus, secondary-side current $i_{CTS}$ represents a stepped down version of the inductor current $i_L$ when switch 312 is ON. Diode 313 prevents reverse current flow through the secondary-side winding 311. Resistor 307 provides a number of functions, such as reverse current protection for diode 313. The resistance value of resistor 307 is a matter of design choice. In at least one embodiment, resistor 307 has a resistance greater than an input resistance of load 352. In at least one embodiment, the resistance of resistor 307 is approximately equal to at least ten times the input resistance of load 352. The secondary-side current $i_{CTS}$ is received by controller 302 at pin 306. The secondary-side current $i_{CTS}$ is related to the switch current $i_{CTP}$ by the winding ratio N between the primary-side winding 309 and secondary-side winding 311 of current transformer 310. Since the switch current $i_{CTP}$ equals the inductor current $i_L$ when switch 312 is ON, the secondary-side current $i_{CTS}$ is related to the inductor current $i_L$ when switch 312 is ON by Equation [1]:

$$i_{CTS}=i_L/N \qquad [1].$$

Current comparator 304 allows controller 302 to generate control signal $CS_2$ without converting the switch current $i_{CTP}$ or the secondary-side current $i_{CTS}$ into a voltage. Thus, power control system 300 avoids power losses associated with otherwise converting the switch current $i_{CTP}$ or the secondary-side current $i_{CTS}$ into a voltage.

The current comparator 304 receives secondary-side current $i_{CTS}$ at pin 306. FETs 314 and 316 are configured as a current mirror. Diode 315 holds node 322 near the source voltage of FET 314 if the source voltage of FET 314 rises above the voltage at node 322 by more than the diode drop voltage of diode 315. The use of FETs 314 and 316 is a matter of design choice. Other components, such as bipolar junction transistors can be substituted for FETs 314 and 316 to implement the current mirror. Constant current supply 318 provides a constant drain current $i_M$ to FET 316. Constant current supply 318 can be, for example, a fixed or programmable current supply. An exemplary programmable current supply is discussed in more detail with reference to FIG. 5. The current mirror provides a constant mirrored drain current $i_M/R$ of FET 314 as a reference current for comparison with secondary-side current $i_{CTS}$. "R" is the current mirror ratio and is established by a ratio of the relative size of FET 316. A control node 317 of switch 312 is connected to pin 319 to receive control signal $CS_2$. As subsequently discussed in more detail, in at least one embodiment, the value R is set so that the timer 328 of control signal generator 320 can determine an elapsed time from a beginning of a pulse of control signal $CS_2$ to turn switch 3120N and a desired average value of inductor current $i_L$.

In accordance with Kirchoff's current law, at node 322:

$$i_S = i_{CTS} - i_M/R \quad [2];$$

where "$i_S$" is the current at node 322 and a result of the comparison between secondary-side current $i_{CTS}$ and reference current $i_M/R$, $i_{Crs}$ is the secondary-side current $i_{CTS}$ into node 322, and $i_M/R$ is the drain current reference of FET 314 out of node 322. Thus, in accordance with Equation [2], current comparator 304 compares the secondary-side current $i_{CTS}$ with the reference current $i_M/R$, and current $i_S$ represents a result of the comparison. In this embodiment, "R" is set so that $i_M/R$ equals $i_{L\_TARGET}/N$, where N is the winding ratio of current transformer 310. Thus, in at least one embodiment, R is determined in accordance with Equation [3]:

$$R = N \cdot i_M / i_{L\_TARGET} \quad [3],$$

where R is the ratio of mirror current $i_M$ to the drain current of FET 314 and $i_{L\_TARGET}$ is a target average value of inductor current $i_L$. For example, if the target inductor current $i_{L\_TARGET}$ is 1 A, the winding ratio N of current transformer 310 is 10, and current $i_M$ is 1 A, then R equals 10.

Comparison current $i_S$ charges node 326 of comparator 324 to a voltage $V_{S0}$. Comparator 324 compares the voltage $V_{S0}$ to a reference voltage $V_{REF0}$ and generates comparison signal $COMP_1$. In at least one embodiment, the value of a reference voltage $V_{REF0}$ input to comparator 324 is set so that so that: (i) voltage $V_{S0}$ at comparator 324 exceeds reference voltage $V_{REF0}$ when secondary-side current $i_{CTS}$ is greater than reference current $i_M/R$ and (ii) voltage $V_{S0}$ is less than voltage $V_{REF0}$ when secondary-side current $i_{CTS}$ is less than the reference current $i_M/R$. Equations [4] and [5] represent one embodiment of the relationships between secondary-side current $i_{CTS}$ and voltage $V_{S0}$:

$$\text{if } i_{CTS} > i_M/R, \text{ then } V_{S0} > V_{REF0} \quad [4], \text{ and}$$

$$\text{if } i_{CTS} < i_M/R, \text{ then } V_{S0} < V_{REF0} \quad [5].$$

The value of voltage $V_{REF0}$ is set so that Equations [4] and [5] are true. In at least one embodiment, comparator 324 includes a high input impedance and is, thus, very responsive to even small changes in current $i_S$. However, in at least one embodiment, comparator 324 is relatively insensitive to voltage offsets. Thus, in at least one embodiment, comparator 324 can be implemented as a relatively simple comparator, such as a flip-flop. Therefore, implementing comparator 324 can decrease manufacturing costs of controller 302.

Control signal generator 320 includes a timer 328. Control signal generator 320 monitors the output signal $COMP_1$ to determine the time T1 that elapses from when the control signal generator 320 turns switch 3120N until the output signal $COMP_1$ indicates that voltage $V_{S0}$ is greater than the reference voltage $V_{REF0}$. Because of the relationships in Equations [1], [2], [3], [4], and [5], when the voltage $V_S$ is greater than the reference voltage $V_{REF0}$, the inductor current $i_L$ has reached the target average value $i_{L\_TARGET}$. For example, in at least one embodiment, control signal generator 320 initiates timer 328 when control signal generator 320 generates a pulse of control signal $CS_2$ to turn switch 3120N.

When the secondary-side current $i_{CTS}$ is less than the reference current $i_M/R$ and, thus, voltage $V_{S0}$ is less than the reference voltage $V_{REF0}$, the output signal $COMP_1$ of comparator 324 is a logical 0. When the secondary-side current $i_{CTS}$ rises to a value greater than the reference current $i_{REF}$ and, thus, voltage $V_{S0}$ is greater than the reference voltage $V_{REF0}$, the output signal $COMP_1$ switches to a logical 1. When the output signal $COMP_1$ switches to logical 1, control signal generator 320 observes the elapsed time T1 determined by timer 328. Control signal generator 320 utilizes the elapsed time T1, feedback of the input voltage $V_X$ at pin 330, and the link voltage WINK at pin 332 to generate control signal $CS_2$. Melanson I describes exemplary systems and methods for generating control signal $CS_2$ using the elapsed time T1. For example, controller 302 can be implemented using analog and/or digital circuits or using analog or digital circuits in combination with a processor executing software instructions stored in a memory.

The secondary-side winding of current transformer 310 is also connected to pin 334 of controller 302. Diode 336 and voltage $V_{DD}$ protect pin 334 from rising above $V_{DD}$ plus a diode voltage drop across diode 336. Diode 338 connects the secondary-side winding to sources of FETs 314 and 316.

During operation of switching power converter 308, voltage source 340 provides an input voltage $V_{IN}$ to full-bridge diode rectifier 342. The voltage source 340 is, for example, a public utility, and the AC voltage $V_{IN}$ is, for example, a 60 Hz/110 V line voltage in the United States of America or a 50 Hz/220 V line voltage in Europe. Voltage source 340 and rectifier 342 represent one embodiment of voltage source 226 (FIG. 2). Voltage $V_X$ is a rectified version of input voltage $V_{IN}$ and is the input voltage to switching power converter 308. Switching power converter 308 includes capacitor 344 to filter high frequency components of voltage $V_X$ and, thus, provide electromagnetic interference (EMI) protection. Control signal $CS_2$ turns switch 3120N and OFF. When switch 312 is ON, the inductor current $i_L$ in inductor 346 ramps up, diode 348 is reverse biased, and inductor current $i_L$ flows through the primary-side winding 309 and through switch 312. In at least one embodiment, switch 312 is a FET. When switch 312 is OFF, the inductor current $i_L$ flows through forward biased diode 348, and charges link capacitor 350. Link capacitor 350 holds link voltage $V_{LINK}$ to an approximately constant value for load 352. Load 352 can be any load. For example, in at least one embodiment, load 352 is a power supply, such as a DC-DC or DC-AC converter. Load 352 can also include, for example, a lighting system that includes one or more light emitting diodes or gas discharge lamps. The specific component values of switching power converter 308 are a matter of design choice and are selected to, for example, allow controller 302 to provide power factor correction and regulate link voltage $V_{LINK}$ for switching power converter 308 and to allow switching power converter 308 to provide a regulated output voltage to load 352.

Figure 4:
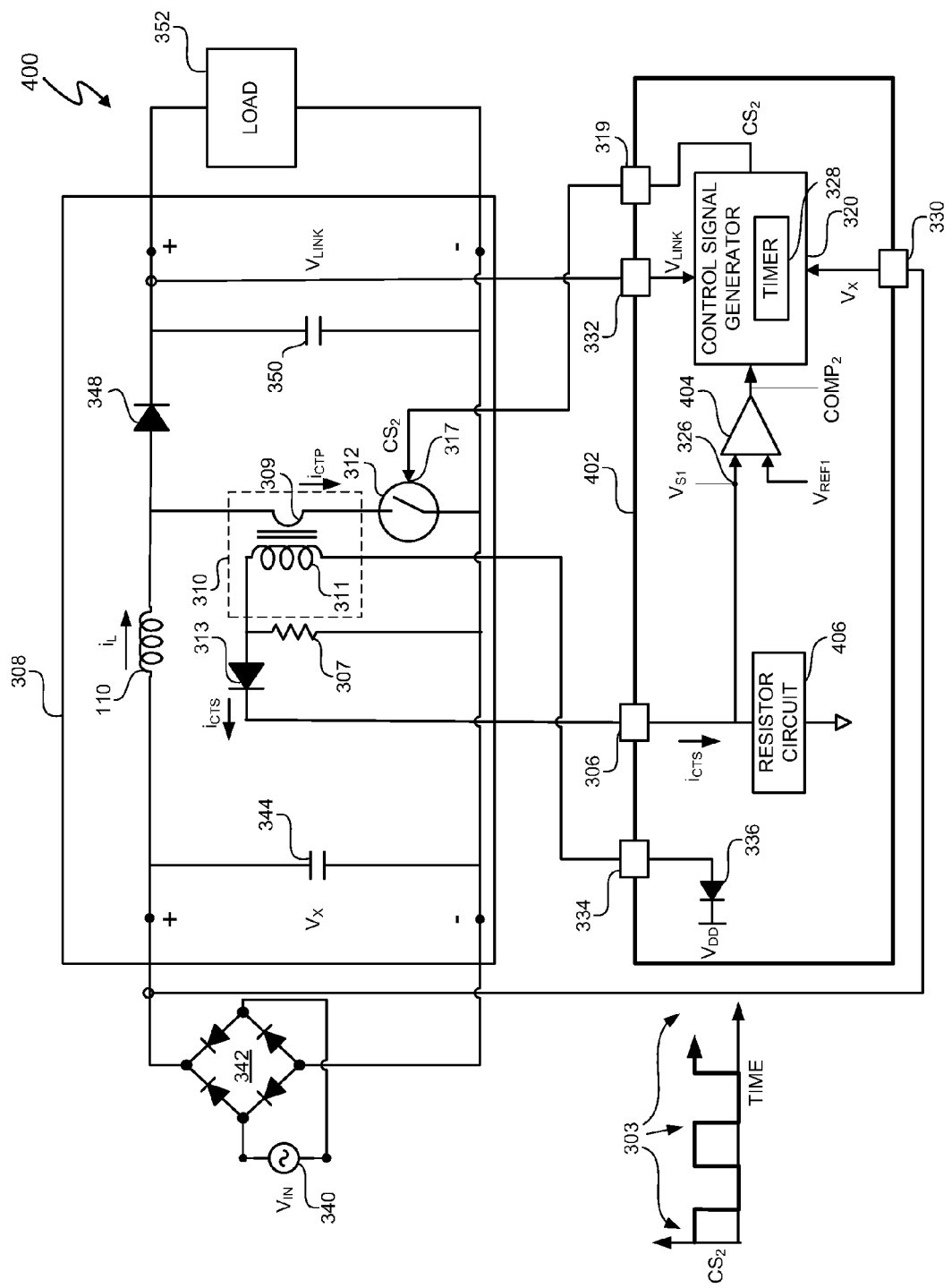
FIG. 4 depicts a power control system with direct current sensing and integrated current to voltage conversion to determine inductor current in a switching power converter.

FIG. 4 depicts power control system 400. Power control system 400 includes controller 402, and controller 402 is an integrated circuit that generates a control signal $CS_2$ to control power factor correction and regulate link voltage $V_{LINK}$ of switching power converter 308. In at least one embodiment, power control system 400 is identical to power control system 300 except that controller 402 converts the received secondary-side current $i_{CTS}$ into a voltage $V_{S1}$ to sense the secondary-side current $i_{CTS}$.

Comparator 404 compares voltage $V_{S1}$ with a reference voltage $V_{REF1}$ and generates a comparison signal $COMP_2$. The voltage $V_{S1}$ represents the secondary-side current $i_{CTS}$. Thus, controller 402 detects the secondary-side current $i_{CTS}$ via comparison signal $COMP_2$. In at least one embodiment, the input impedance of comparator 404 is much larger than the resistance of resistor circuit 406. Resistor circuit 406 represents one embodiment of the voltage converter 219 (FIG. 2). Thus, the voltage $V_{S1}$ is approximately the product of the secondary-side current $i_{CTS}$ and the resistance R of resistor circuit 406, i.e. $V_{S1} \approx i_{CTS} \cdot R$. Resistor circuit 406 represents one embodiment of the voltage converter 219 (FIG. 2).

The value of the resistance $R_{406}$ of resistor circuit 406 is a matter of design choice and, in at least one embodiment, is set so that the comparison signal $COMP_2$ changes logical states when the secondary-side current $i_{CTS}$ equals an average target value $i_{TARGET}$. Thus, in at least one embodiment, Equation [6]:

$$R_{406} = V_{REF1}/i_{TARGET} \quad [6].$$

wherein $R_{406}$ is the resistance of resistor circuit 406, $V_{REF1}$ is a reference voltage, and $i_{TARGET}$ is an average target value of secondary-side current $i_{CTS}$. For example, if the target average value of $i_{CTS}$ is 250 mA and $V_{REF1}$ is 1V, $R=V_{REF1}/i_{TARGET}=4$ ohms.

When the secondary-side current $i_{CTS}$ is less than the target current $i_{TARGET}$, voltage $V_{S1}$ is less than the reference voltage $V_{REF1}$, and the output signal $COMP_1$ of comparator 324 is a logical 0. When the secondary-side current $i_{CTS}$ rises to a value greater than the average target value $i_{TARGET}$, voltage $V_{S1}$ is greater than the reference voltage $V_{REF}$, and the output signal $COMP_1$ switches to a logical 1. When the output signal $COMP_2$ switches to logical 1, control signal generator 328 observes the elapsed time T1 determined by timer 328. Control signal generator 320 utilizes the elapsed time T1, feedback of the input voltage $V_X$ at pin 330, and the link voltage $V_{LINK}$ at pin 332 to generate control signal $CS_2$ as previously described with reference to controller 302 (FIG. 3).

Resistor circuit 406 can be any type of resistor circuit. In at least one embodiment, resistor circuit 406 is a single resistor or combination of resistors having a fixed value. In at least one embodiment, resistor circuit 406 is a variable resistor, such as a programmable, variable resistor, whose value can be adjusted in accordance with changes to the target current value $i_{TARGET}$.

Figure 5:
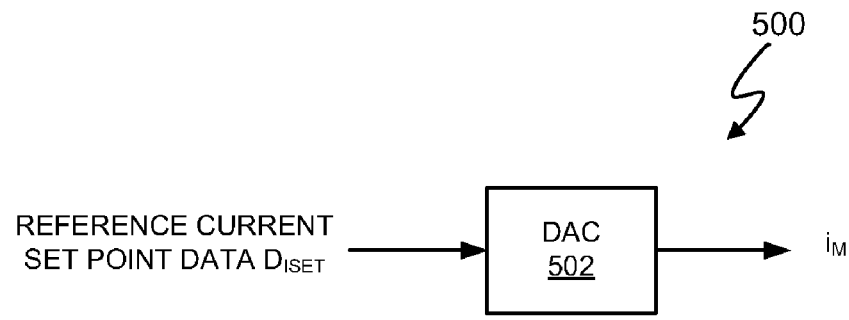
FIG. 5 depicts a programmable current reference source for the power control system of FIG. 3.

FIG. 5 depicts a programmable current source 500, which represents one embodiment of current source 318 (FIG. 3). Programmable current source 500 includes a digital-to-analog converter (DAC) 502 that receives reference current set point data $D_{ISET}$. In at least one embodiment, the reference current set point data $D_{ISET}$ is a digital signal representing a desired value of drain current $i_M$ (FIG. 3). In at least one embodiment, the desired value of drain current $i_M$ is programmed so that switching power converter 308 (FIG. 3) is power factor corrected and regulates the link voltage $V_{LINK}$ to a desired value. In at least one embodiment, the drain current $i_M$ is calibrated based on the characteristics of power control system 300 that affect the value of, for example, secondary-side current $i_{CTS}$. For example, the turns ratio between the primary-side and secondary-side windings of transformer 310 affect the value of secondary-side current $i_{CTS}$. Different switching power converters may have different turns ratios. Thus, the drain current $i_M$ can be programmed based on knowledge of the specific switching power converter that will be connected to controller 302. For example, the reference current set point data $D_{ISET}$ can be programmed to increase or decrease drain current $i_M$ as the respective turns ratios increase and decrease. Additionally, the desired average target inductor current $i_{L\_TARGET}$ may change depending upon, for example, power usage of different loads. Thus, in at least one embodiment, the drain current $i_M$ can be programmed to account for various desired values of target inductor current $i_{L\_TARGET}$ so that Equations [3], [4], and [5] are satisfied to allow the switching power converter 308 to generate the desired average target inductor current $i_{L\_TARGET}$.

DAC 502 converts the reference current set point data $D_{ISET}$ into the analog, constant drain current $i_M$. The DAC 502 can be any DAC, and the particular implementation of DAC 502 is a matter of design choice. The manner of providing the reference current set point data $D_{ISET}$ to DAC 502 is a matter of design choice. For example, in at least one embodiment, the reference current set point data $D_{ISET}$ can be programmed into a memory (not shown) of controller 302 (FIG. 3). In at least one embodiment, the reference current set point data $D_{ISET}$ is preset in controller 302 or supplied through a data pin (not shown) of controller 302.

Figure 6:
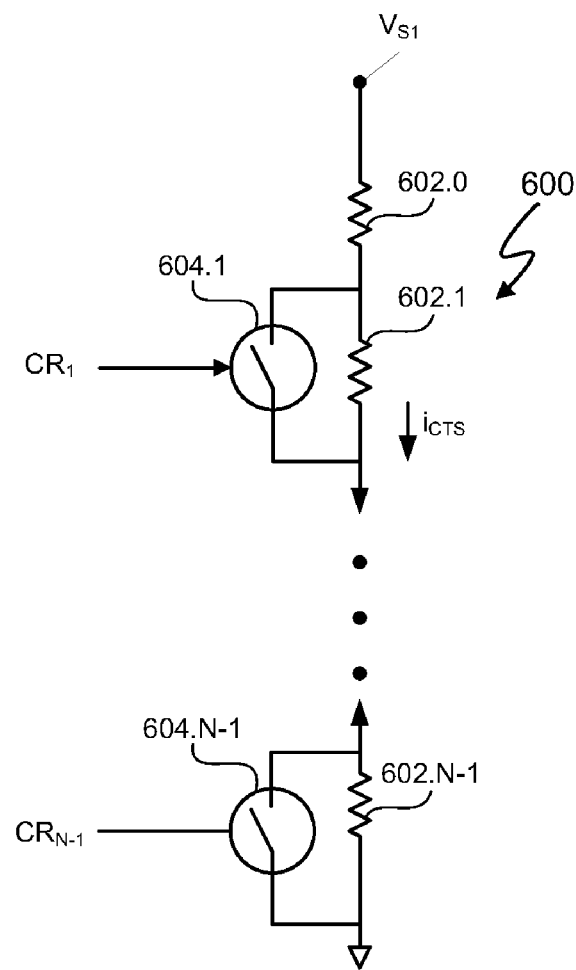
FIG. 6 depicts a programmable resistor for the power control system of FIG. 4.

FIG. 6 depicts a programmable resistor circuit 600, which represents one embodiment of resistor circuit 406. Programmable resistor circuit 600 includes N resistors 602.0-602.N-1, where N is an index representing the number of resistors in programmable resistor circuit 600 and N is greater than or equal to 2. In at least one embodiment, the values of resistors 602.0-602.N-1 are set to provide a desired range of values for the target current $i_{TARGET}$. From equation [6], since, in at least one embodiment, the reference voltage $V_{REF}$ is fixed, adjusting the resistance R of resistor circuit 600 adjusts the target current $i_{TARGET}$. Switches 604.1-604.N-1 are configured in parallel with respective resistors 602.1-602.N-1. The resistance R of programmable circuit 600 is programmed using switch control signals $CR_1$-$CR_{N-1}$ to control the conductivity of switches 604.1-604.N-1. Controlling the conductivity of switches 604.1-604.N-1 controls the series resistance of programmable resistor circuit 600, and, thus, sets the value of resistance R. In at least one embodiment, switches 604.1-604.N-1 are n-channel field effect transistors, and control signals $CR_1$-$CR_{N-1}$ are gate voltages.

The manner of setting values control signals $CR_1$-$CR_{N-1}$ is a matter of design choice. In at least one embodiment, controller 402 (FIG. 4) sets the values of control signals $CR_1$-$CR_{N-1}$ in accordance with data received via a data pin (not shown) of controller 302. In at least one embodiment, the values of control signals $CR_1$-$CR_{N-1}$ are fixed upon manufacture of controller 402. The configuration of resistors 602.0-602.N-1 is a matter of design choice. Resistors 602.0-602.N-1 are configured in series but can also be configured in parallel or a combination of series and parallel.

Thus, in at least one embodiment, a power control system includes a current transformer to step down a switch current of a switching power converter. In at least one embodiment, a controller utilizes current sensing of the stepped down switch current to control a switching power converter. By utilizing current sensing, in at least one embodiment, the controller can reduce component costs.

Although embodiments have been described in detail, it should be understood that various changes, substitutions, and alterations can be made hereto without departing from the spirit and scope of the invention as defined by the appended claims.

What is claimed is:

1. An apparatus comprising:
an integrated circuit comprising:
a controller configured to:
receive a current from a secondary-side of a current transformer, wherein the secondary-side current represents an inductor current in a switching power converter at least during a time when a switch, which is coupled to the inductor and included in the switching power converter, is conductive; and
utilize the received secondary-side current to control power factor correction of the switching power converter;
generate a switch control signal to control conductivity of the switch to control power factor correction and regulate the link voltage;
determine an elapsed time between a beginning of a conductive time of the switch and when the received current from the current transformer exceeds the reference current; and
utilize the elapsed time to control conductivity of the switch.

2. The apparatus of claim 1 wherein the controller includes a current comparator to compare the received current from current transformer and a reference current, and the controller is further configured to generate a control signal using a comparison result between the received current from the current transformer and the reference current, wherein the reference current is approximately constant at least while the switch is conductive.

3. The apparatus of claim 1 wherein the current comparator comprises:
a node to (i) receive the current from the current transformer and (ii) receive the reference current; and
a signal coupled to the node to conduct a current representing a comparison between the received current and the reference current.

4. The apparatus of claim 1 wherein the controller further comprises a current mirror to generate the reference current.

5. The apparatus of claim 2 wherein the controller further includes a programmable current source to generate the reference current.

6. The apparatus of claim 1 wherein the controller includes a voltage converter to convert the received current into a voltage representing the received current and further includes a comparator to compare the voltage with a reference voltage, and the controller is further configured to generate a control signal using a comparison result between the voltage representing the received current and the reference voltage.

7. The apparatus of claim 6 wherein the voltage converter comprises a programmable resistor circuit.

8. The apparatus of claim 1 wherein to determine the elapsed time between a beginning of a conductive time of the switch and when the received current from the current transformer exceeds the reference current comprises initiating a timer at the beginning of the conductive time of the switch and determining the elapsed time from the timer from the beginning of the conductive time of the switch until the received current from the current transformer exceeds the reference current.

9. A method comprising:
receiving a current from a secondary-side of a current transformer at a node of a switching power converter controller, wherein the secondary-side current represents an inductor current in a switching power converter at least during a time when a switch, which is coupled to the inductor and included in the switching power converter, is conductive;
utilizing the received secondary-side current to control power factor correction of the switching power converter;
generating a switch control signal to control conductivity of the switch to control power factor correction and regulate the link voltage;
determining an elapsed time between a beginning of a conductive time of the switch and when the received current from the current transformer exceeds the reference current; and
utilizing the elapsed time to control conductivity of the switch.

10. The method of claim 9 further comprising:
comparing the received current from current transformer and a reference current; and
generating a control signal using a comparison result between the received current from the current transformer and the reference current, wherein the reference current is approximately constant at least while the switch is conductive.

11. The method of claim 9 wherein determining an elapsed time between a beginning of a conductive time of the switch and when the received current from the current transformer exceeds the reference current comprises:
initiating a timer at the beginning of the conductive time of the switch; and
determining the elapsed time from the timer from the beginning of the conductive time of the switch until the received current from the current transformer exceeds the reference current.

12. The method of claim 10 wherein the current comparator comprises:
receiving: (i) the current from the current transformer and (ii) the reference current at a node in the controller; and
conducting a current representing a comparison between the received current and the reference current.

13. The method of claim 10 further comprising:
generating the reference current using a current mirror.

14. The method of claim 10 further comprising:
programming a current source to generate the reference current.

15. The method of claim 9 further comprising:
converting the received current into a voltage representing the received current;
comparing the voltage with a reference voltage; and
generating a control signal using a comparison result between the voltage representing the received current and the reference voltage.

16. The method of claim 15 further comprising:
programming the reference voltage.

17. An apparatus comprising:
an integrated circuit comprising:
a controller configured to:
receive a current from a secondary-side of a current transformer, wherein the secondary-side current represents an inductor current in switching power converter at least during a time when a switch, which is coupled to the inductor and included in the switching power converter, is conductive;
compare the current received from the current transformer with a reference current;

generate a switch control signal to control conductivity of the switch to control power factor correction and regulate the link voltage;

determine an elapsed time between a beginning of a conductive time of the switch and when the current received from the current transformer exceeds the reference current, wherein the reference current is approximately constant at least while the switch is conductive; and utilize the elapsed time to control ity of the switch.

18. The apparatus of claim 17 wherein the controller includes a current comparator to compare the received current from current transformer and a reference current, and the controller is further configured to generate a control signal using a comparison result between the received current from the current transformer and the reference current.

19. The apparatus of claim 18 wherein the current comparator comprises:

a node to (i) receive the current from the current transformer and (ii) receive the reference current; and a signal coupled to the node to conduct a current representing a comparison between the received current and the reference current.

20. The apparatus of claim 18 wherein the controller further comprises a current mirror to generate the reference current.

21. The apparatus of claim 18 wherein the controller further includes a programmable current source to generate the reference current.

22. The apparatus of claim 17 wherein the controller includes a voltage converter to convert the received current into a voltage representing the received current and further includes a comparator to compare the voltage with a reference voltage, and the controller is further configured to generate a control signal using a comparison result between the voltage representing the received current and the reference voltage.

23. The apparatus of claim 22 wherein the voltage converter comprises a programmable resistor circuit.

24. The apparatus of claim 17 wherein to determine the elapsed time between a beginning of a conductive time of the switch and when the received current from the current transformer exceeds the reference current comprises initiating a timer at the beginning of the conductive time of the switch and determining the elapsed time from the timer from the beginning of the conductive time of the switch until the received current from the current transformer exceeds the reference current.

* * * * *